US007457360B2

(12) United States Patent
Otsuka (10) Patent No.: US 7,457,360 B2
(45) Date of Patent: Nov. 25, 2008

(54) METHOD AND APPARATUS FOR ENCODING IMAGE DATA WITH PRE-ENCODING SCHEME, AND METHOD AND APPARATUS FOR RECORDING VIDEO USING THE SAME (75) Inventor: Tatsushi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 11/044,023

(22) Filed: Jan. 28, 2005

(65) Prior Publication Data
US 2006/0093231 A1 May 4, 2006

(30) Foreign Application Priority Data
Oct. 28, 2004 (JP) ............... 2004-314874

(51) Int. Cl.
H04B 1/66 (2006.01)
(52) U.S. Cl. .............. 375/240.04; 382/239; 375/240.06
(58) Field of Classification Search ........................ 375/240.02–240.07; 382/239
See application file for complete search history.

(56) References Cited

U.S. PATENT DOCUMENTS

| 5,751,358 | A  | * | 5/1998  | Suzuki et al. | 375/240.04 |
| 5,761,398 | A  | * | 6/1998  | Legall        | 358/1.15   |
| 5,933,194 | A  | * | 8/1999  | Kim et al.    | 348/403.1  |
| 6,046,774 | A  | * | 4/2000  | Heo et al.    | 375/240.16 |
| 6,233,278 | B1 | * | 5/2001  | Dieterich     | 375/240.03 |
| 6,363,114 | B1 | * | 3/2002  | Kato          | 375/240.04 |
| 6,507,615 | B1 | * | 1/2003  | Tsujii et al. | 375/240.04 |
| 6,678,324 | B1 | * | 1/2004  | Yamauchi      | 375/240.04 |
| 6,697,529 | B2 |   | 2/2004  | Kuniba        |            |
| 6,826,228 | B1 | * | 11/2004 | Hui           | 375/240.03 |
| 6,845,129 | B2 | * | 1/2005  | Golin         | 375/240.02 |
| 6,888,889 | B2 | * | 5/2005  | Sato et al.   | 375/240.12 |
| 6,928,112 | B2 | * | 8/2005  | Kato          | 375/240.04 |
| 7,006,698 | B2 | * | 2/2006  | Adiletta et al. | 382/236  |
| 7,095,784 | B2 | * | 8/2006  | Chang et al.  | 375/240.03 |
| 2002/0118748 | A1 | * | 8/2002  | Inomata et al. | 375/240.04 |
| 2002/0122484 | A1 | * | 9/2002  | Mihara et al.  | 375/240.04 |
| 2002/0186768 | A1 | * | 12/2002 | Dimitrova et al. | 375/240.12 |
| 2003/0152151 | A1 | * | 8/2003  | Hsieh et al.   | 375/240.26 |
| 2005/0190838 | A1 | * | 9/2005  | Sato et al.    | 375/240.12 |
| 2007/0263719 | A1 | * | 11/2007 | Tahara et al.  | 375/240.02 |

FOREIGN PATENT DOCUMENTS

| JP | 07-312756   | 11/1995 |
| JP | 11-075154   | 3/1999  |
| JP | 2000-059774 | 2/2000  |
| JP | 2000-114980 | 4/2000  |
| JP | 2001-501429 | 1/2001  |

OTHER PUBLICATIONS

International Publication No. WO 99/07158; published Feb. 11, 1999.

* cited by examiner

Primary Examiner—Sean Motsinger
(74) Attorney, Agent, or Firm—Arent Fox LLP (57) ABSTRACT An encoding apparatus includes a pre-encoding unit that performs learning based on input image data from before starting a video recording; and an encoding unit that encodes image data using an encoding parameter. The pre-encoding unit includes an image input unit; a motion searching unit that obtains a motion vector of an image based on current image data and past image data; and a table group that represents a relation between encoding parameters and an amount of information generated for various scenes. The pre-encoding unit selects a first table close to a combination of brightness, hue, and complexity of a pattern of a current image and the motion vector, from the table group, and takes the first table as the result of the learning.

20 Claims, 8 Drawing Sheets

METHOD AND APPARATUS FOR ENCODING IMAGE DATA WITH PRE-ENCODING SCHEME, AND METHOD AND APPARATUS FOR RECORDING VIDEO USING THE SAME

CROSS-REFERENCE TO RELATED APPLICATIONS

This application is based upon and claims the benefit of priority from the prior Japanese Patent Application No. 2004-314874, filed on Oct. 28, 2004, the entire contents of which are incorporated herein by reference.

BACKGROUND OF THE INVENTION

1) Field of the Invention

The present invention relates to a technology for encoding and compressing moving-image data on a real time basis, in conformity with the moving picture experts group (MPEG) standard.

2) Description of the Related Art

In the MPEG-2 standard applied products, it is necessary to store image data within a certain bit rate, while encoding the image data on a real time basis. In the encoding processing of a two-path system in which image data is encoded beforehand, and actual encoding is performed after observing the change in the amount of information generated, allocation of the bit rate can be performed accurately. However, the two-path system is not suitable when it is necessary to perform encoding on a real time bases, such as a movie camera.

Generally, the encoding at the time of encoding on a real time bases is performed in the following manner. That is, encoding of a first picture is performed by predicting the amount of information generated to some extent at the time of starting encoding (at the time of starting video recording). Based on the information amount generated as a result thereof, the allocated information amount for a second picture is adjusted and the second picture is encoded. For a third picture, based on the information amount generated by encoding of the first and the second pictures, the allocated information amount therefor is adjusted and the third picture is encoded. Thus, while performing feedback control based on the amount of information generated of pictures encoded previously, the relation between the input image and the amount of information generated is gradually learned, so that appropriate allocation of information amount can be obtained.

As an information amount conversion circuit for changing the bit rate of a bit stream including main data, whose data length changes according to the bit rate, such as a bit stream encoded in conformity with the MPEG-2 Standard, a circuit has been proposed, which has a unit that cuts out the main data from the bit stream, a unit that converts the cut main data according to a target bit rate and outputs the converted main data, and a unit that inserts the converted main data into the bit stream, instead of the main data before the conversion (see, for example, Japanese Patent Application Laid-open No. H7-312756). The invention disclosed in this literature increases the compressibility by re-encoding the bit stream encoded according to the MPEG Standard, and is different from the present invention.

Further, as a variable bit rate encoding method, a method has been proposed, which includes: an analysis step of encoding an image sequence by using a predetermined quantization step size and generating a bit stream that does not satisfy the restriction of a specific step size in which an average bit rate in this sequence is required; a prediction step of predicting the quantization step size used for encoding the bit stream based on a predetermined target bit rate; a step of obtaining more accurate evaluation for the step size by repeating at least once the analysis step and the prediction step; and a final control step of comparing the cumulative bit rate for all previous frames with the predicted cumulative bit rate to adjust the step size so that the cumulative bit rate matches with the target bit rate (see, for example, Japanese Patent Application Laid-open No. 2001-501429). The invention disclosed in this literature repeats the analysis step and the prediction step several times to generate a bit stream, which is different from the present invention.

In the conventional method in which the relation between the input image and the amount of information generated is gradually learned, while performing the feedback control, several to several tens pictures are required from the start of encoding until a stable state can be obtained. In other words, for a while after having started encoding, learning of allocation of the amount of information generated has not been done. Therefore, from starting video recording until a stable state can be obtained, there are problems in that the image quality is poor, and too much bit rate may be allocated to the required image quality, thereby using the information amount uselessly. Further, there is no solution as to how the encoding parameter can be set in order to generate the information amount close to the target information amount.

There is a method of starting encoding earlier than the original video recording starting time to perform learning, and recording a bit stream on a recording medium since learning has finished and the stable state has been obtained. With this method, however, since it is necessary to activate the encoding unit before starting the actual video recording, power consumption is increased uselessly. Therefore, when it is desired to reduce the power consumption, this method is not suitable, for example, to a movie camera driven by battery.

SUMMARY OF THE INVENTION

It is an object of the present invention to solve at least the above problems in the conventional technology.

An encoding apparatus according to one aspect of the present invention includes a pre-encoding unit that performs learning based on input image data from before starting a video recording; and an encoding unit that encodes image data to be recorded, using an encoding parameter determined based on a result of the learning.

A video recording apparatus according to another aspect of the present invention includes a pre-encoding unit that performs learning based on input image data from before starting a video recording; and an encoding unit that encodes image data to be recorded using an encoding parameter determined based on a result of the learning; and a recording unit that records the image data at a time of starting the video recording.

An encoding method according to still another aspect of the present invention includes a pre-encoding, from before starting a video recording, including obtaining brightness, hue, and complexity of a pattern of a current image based on input image data, obtaining a motion vector of an image based on current image data and past image data, selecting a first table that is close to a combination of the brightness, the hue, and the complexity of a pattern of the current image and the motion vector, from a table group that represents a relation between encoding parameters and an amount of information generated with respect to various scenes, the table group being prepared in advance, and taking the first table as a result of learning; and encoding image data to be recorded, using an encoding parameter determined based on the result of the learning.

A video recording method according to still another aspect of the present invention includes a pre-encoding, from before starting a video recording, including obtaining brightness, hue, and complexity of a pattern of a current image based on input image data, obtaining a motion vector of an image based on current image data and past image data, selecting a first table that is close to a combination of the brightness, the hue, and the complexity of a pattern of the current image and the motion vector, from a table group that represents a relation between encoding parameters and an amount of information generated with respect to various scenes, the table group being prepared in advance, and taking the first table as a result of learning; encoding image data to be recorded, using an encoding parameter determined based on the result of the learning; and recording the image data at a time of starting the video recording.

The other objects, features, and advantages of the present invention are specifically set forth in or will become apparent from the following detailed description of the invention when read in conjunction with the accompanying drawings.

DETAILED DESCRIPTION

Exemplary embodiments of a method and an apparatus for encoding image data and a method and an apparatus for recording a video using the same, according to the present invention will be explained below in detail with reference to the accompanying drawings. An example in which the present invention is applied to a movie camera that records image data by encoding the image data in conformity with, for example, the MPEG-2 Standard.

Figure 1:
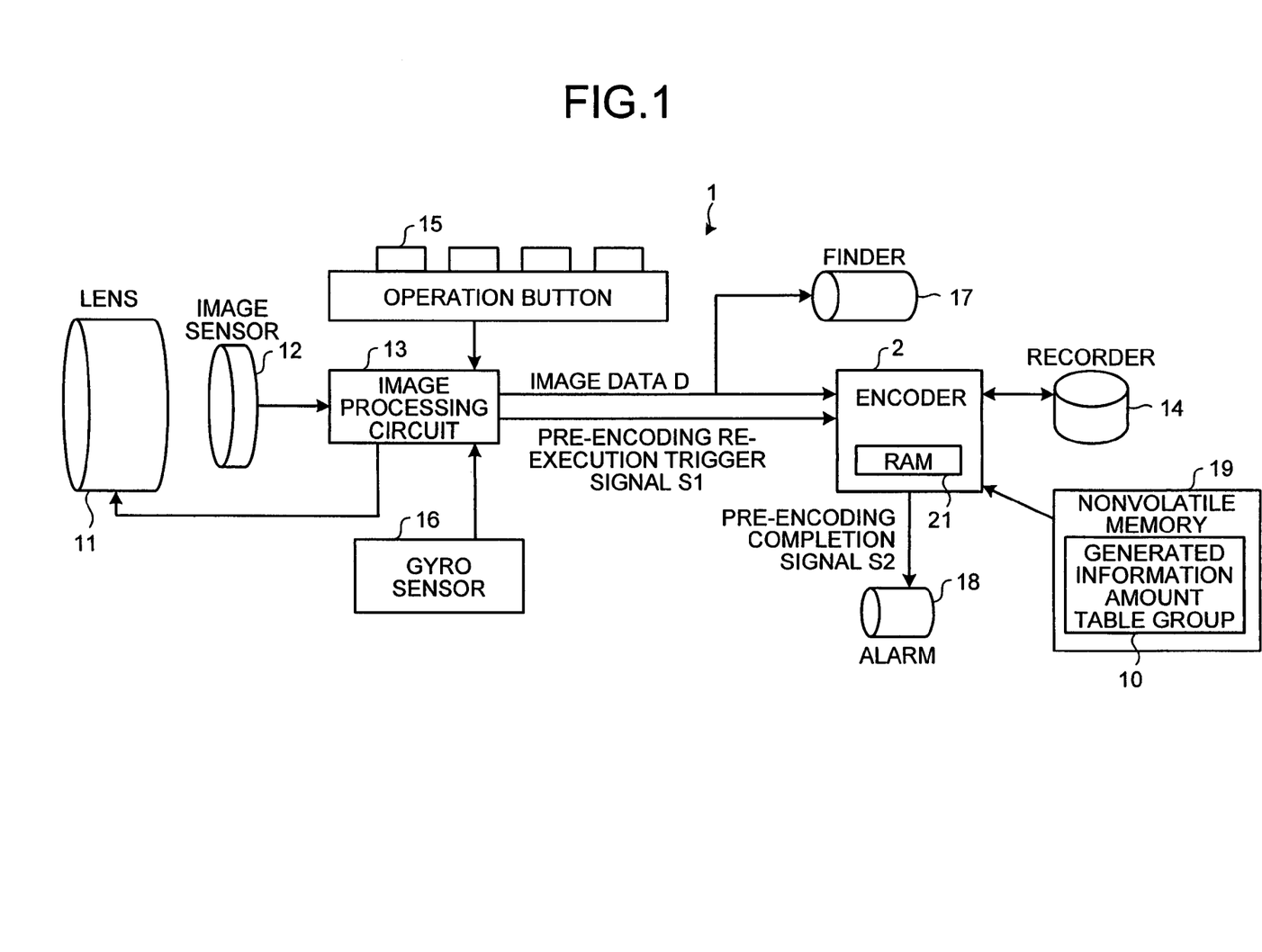
FIG. 1 is a block diagram of a movie camera according to an embodiment of the present invention.

FIG. 1 is a block diagram of a movie camera according to an embodiment of the present invention. As shown in FIG. 1, a movie camera 1 includes a lens 11, an image sensor 12 formed of a solid-state image pick-up device such as a charge coupled device (CCD) or a complementary metal-oxide semiconductor (CMOS), an image processing circuit 13, an encoding unit 2 serving as an pre-encoding unit before starting video recording and as an encoding unit at the time of video recording, a recorder 14 such as a tape or a disc forming a recording unit, a nonvolatile memory 19 such as a read only memory (ROM) or an electronically erasable and programmable PROM (EEPROM), and a amount of information generated table group 10 including a plurality of tables for indicating the relation between encoding parameters with respect to various scenes and the amount of information generated.

The amount of information generated table group 10 is stored beforehand in the nonvolatile memory 19. The encoding unit 2 includes a writable memory (random access memory (RAM)) 21 such as a RAM for storing learning results by pre-encoding before starting the video recording. The movie camera 1 includes various kinds of operation buttons for performing operations such as zooming and focusing, and for operating start/stop of video recording, a gyro sensor 16 that outputs information for performing stabilization, a finder 17, and an alarm unit 18.

The optical signal input by the lens 11 is photoelectrically exchanged by the image sensor 12 at the time of video recording to be turned into an electric signal. The electric signal is processed by the image processing circuit 13. The image processing circuit 13 performs image processing based on information for performing various kinds of controls, such as zooming, automatic focusing, stabilization, and automatic exposure. The image-processed image data D is transmitted to the encoding unit 2 and the finder 17. The encoding unit 2 encodes the image data D based on, for example, the MPEG-2 standard, to generate a bit stream. The bit stream is stored in the recorder 14.

On the other hand, the encoding unit 2 performs learning by pre-encoding based on the image data D output by the image processing circuit 13, before a user presses a video recording button, that is, before starting video recording. The learning by the pre-encoding is executed, for example, when the movie camera 1 is turned on in a camera mode, or when the turned on movie camera 1 is changed from a reproduction mode to the camera mode. The learning by pre-encoding is executed when a pre-encoding re-execution trigger signal S1 is input from the image processing circuit 13.

The details of the learning contents by pre-encoding will be explained later. The encoding unit 2 outputs a pre-encoding completion signal S2 to the alarm unit 18, when learning has finished. Accordingly, the alarm unit 18 gives an alarm, such as a sound informing the user of learning completion, or a message in the finder 17. The configuration may be such that the alarm gives an alarm when the user attempts to start video recording before learning is completed.

The generation timing of the pre-encoding re-execution trigger signal S1 will be explained next. In the case of the movie camera 1, the input image does not change largely, unless the user changes the direction of the movie camera 1, or the user performs operation such as zooming in or out. Therefore, it is not necessary to continue learning by pre-encoding, from a point in time when the movie camera 1 is turned on in the camera mode, or when the mode of the movie camera 1 is changed to the camera mode until immediately before starting video recording.

According to the present embodiment, after completion of learning by pre-encoding at the time of turning on the power source or changing the mode, and when the input image largely changes, the pre-encoding re-execution trigger signal S1 is generated to execute learning by pre-encoding again. When the input image does not largely change, it is not necessary to re-execute learning by pre-encoding.

Instances in which the input image largely changes include: (1) when it is detected that there is a change on a screen due to the operation such as zooming or focusing by the user; (2) when it is detected that the direction of the movie camera 1 has been changed from a change in information, such as stabilization (excluding a change in direction due to hand movement); (3) when it is detected that a subject has moved from a change in information of automatic focusing; and (4) when it is detected that the brightness of the subject has changed from a change in information of automatic exposure. Since the image processing circuit 13 processes the pieces of information of from (1) to (4), the pre-encoding re-execution trigger signal S1 can be generated and issued based on the pieces of information.

A trigger by which the user can intentionally start learning by pre-encoding may be provided. As such a trigger, for example, half push of the video recording button or the like may be used. In this case, if the configuration is such that learning by pre-encoding is started when the user half-pushes the video recording button, and when learning has been completed, this matter is informed to the user by the alarm unit 18, the user can start video recording after confirming completion of learning. If the video recording button is pushed, that is, the video recording is started, before completion of learning, the video recording can be started with a value (default value) of the preset encoding parameter. The default value is stored, for example, in the nonvolatile memory 19.

Figure 2:
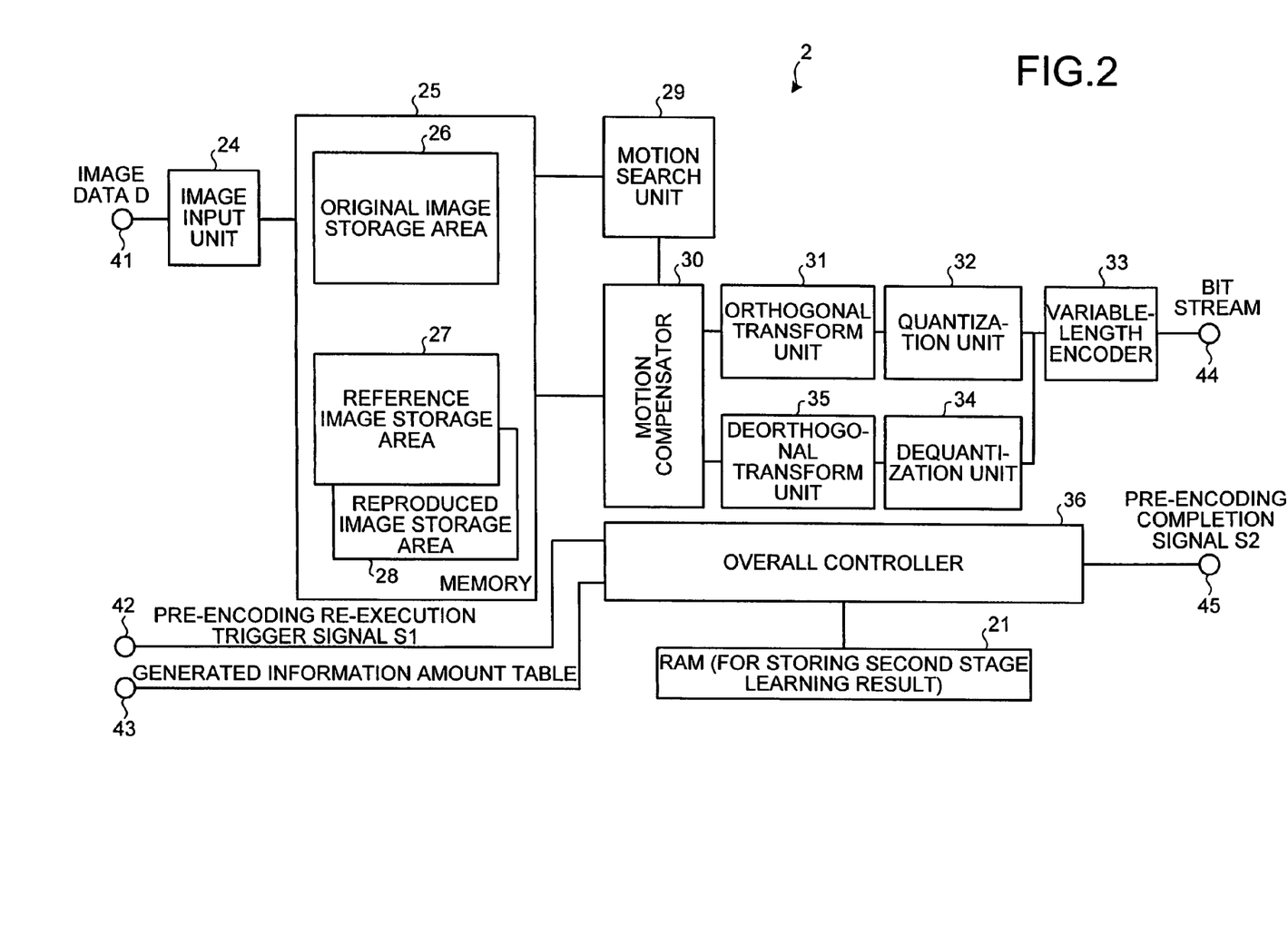
FIG. 2 is a block diagram of an encoding unit according to the present embodiment.

FIG. 2 is a block diagram of an encoding unit 2 according to the present embodiment. As shown in FIG. 2, the encoding unit 2 includes an image input unit 24, a memory 25, a motion searching unit 29, a motion compensating unit 30, an orthogonal transform unit 31, a quantization unit 32, a variable-length encoding unit 33, a dequantization unit 34, a deorthogonal transform unit 35, an overall controller 36, and the memory 21 (hereinafter, "learning result storing memory 21").

The memory 25, such as a RAM, temporarily stores the image data D, and has an original image storage area 26, a reference image storage area 27, and a reproduced image storage area 28. The image input unit 24, the motion searching unit 29, and the motion compensating unit 30 respectively constitute an image input unit, a motion searching unit, and a motion compensation unit in the pre-encoding unit. The orthogonal converter 31, the quantization unit 32, and the variable-length encoding unit 33 constitute an information-amount obtaining unit in the pre-encoding unit.

The image data D is input to the image input unit 24 via an image data input terminal 41. The bit stream generated by the variable-length encoding unit 33 is output from a bit stream output terminal 44. The pre-encoding re-execution trigger signal S1 is input to the overall controller 36 via a pre-encoding re-execution trigger signal input terminal 42. The overall controller 36 refers to the amount of information generated table group 10 via an amount of information generated table input terminal 43. The overall controller 36 outputs a pre-encoding completion signal S2 from a pre-encoding completion signal output terminal 45.

Figure 3:
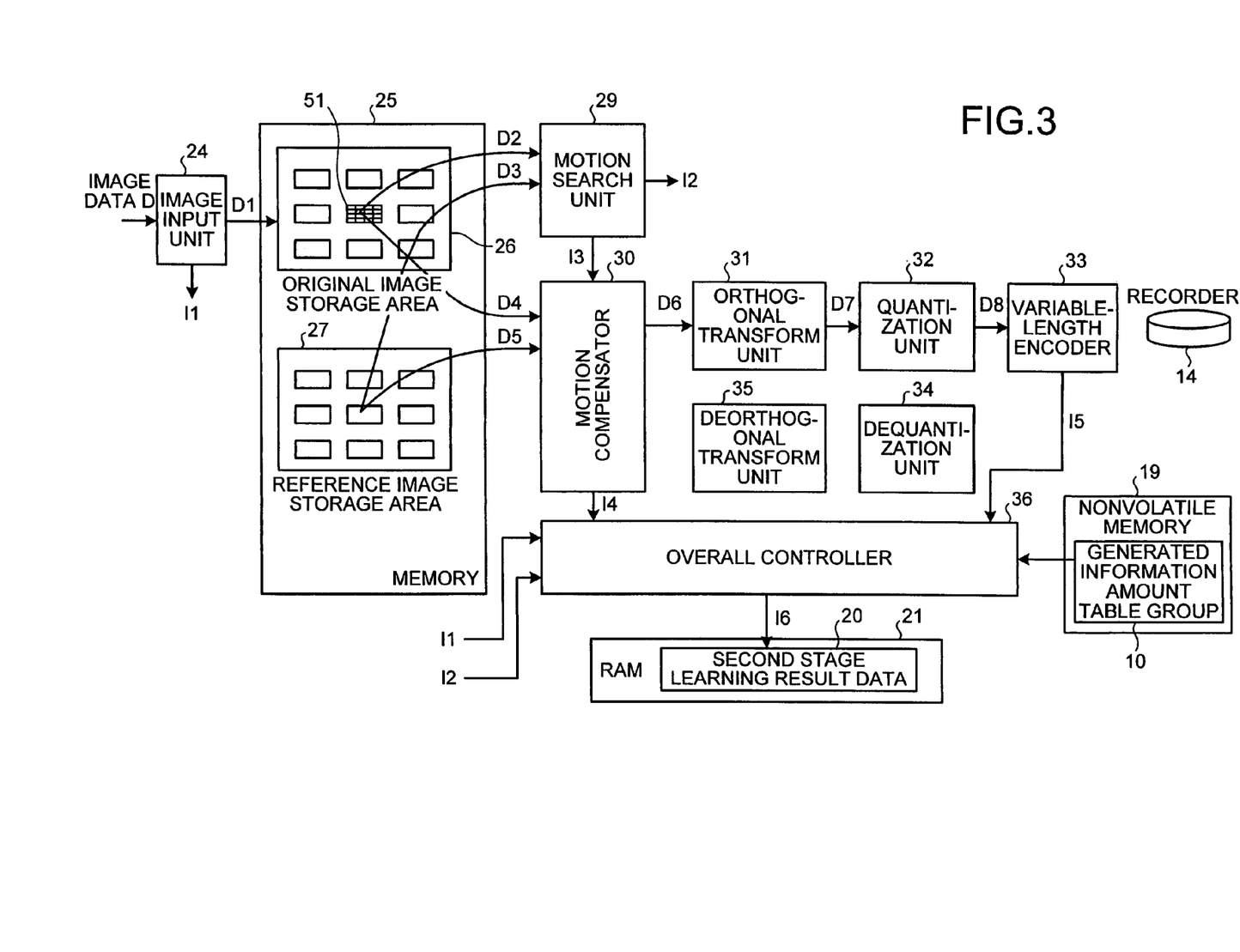
FIG. 3 is a block diagram for explaining a data flow when executing learning process.
Figure 4:
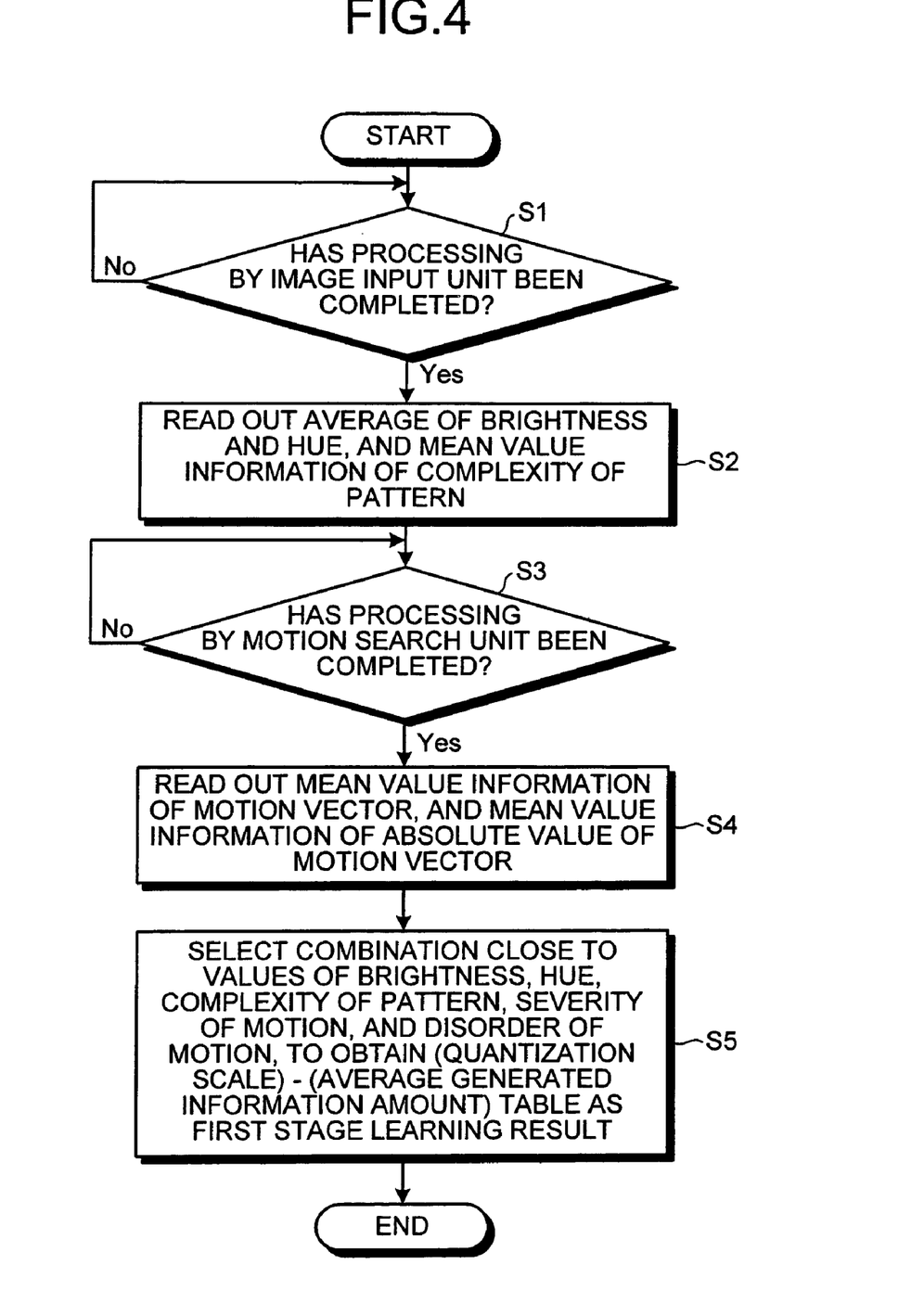
FIG. 4 is a flowchart of the learning process at a first stage.

The learning content by pre-encoding will be explained below. Though not particularly limited, an instance that a quantization scale, being one of the encoding parameters, is adjusted by learning will be explained as an example. The quantization scale is a parameter largely affecting an increase and decrease in the amount of information generated. FIG. 3 is a block diagram for explaining a data flow when executing learning process. FIG. 4 is a flowchart of the learning process at a first stage.

Figure 5:
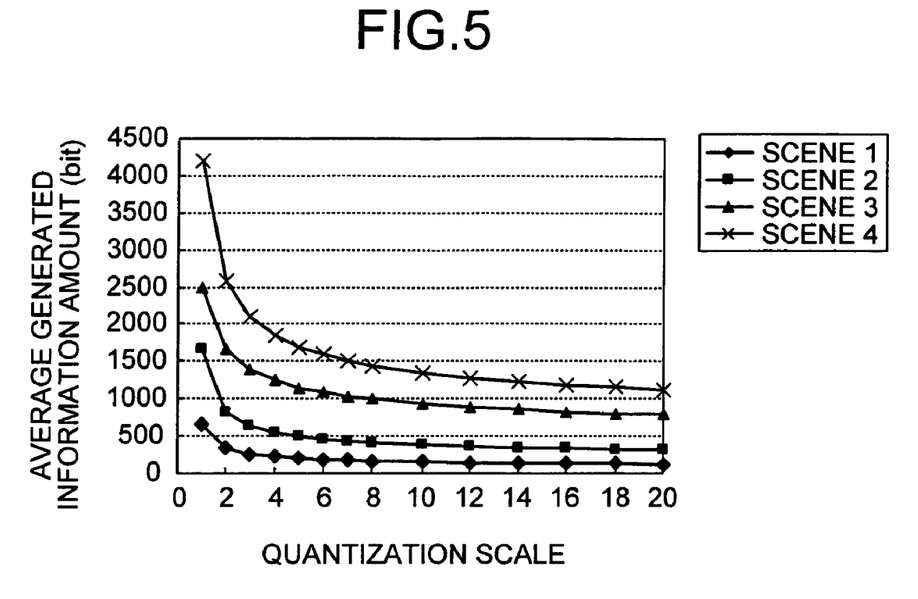
FIG. 5 is a graph of quantization scale versus average amount of generated information.
Figure 6:
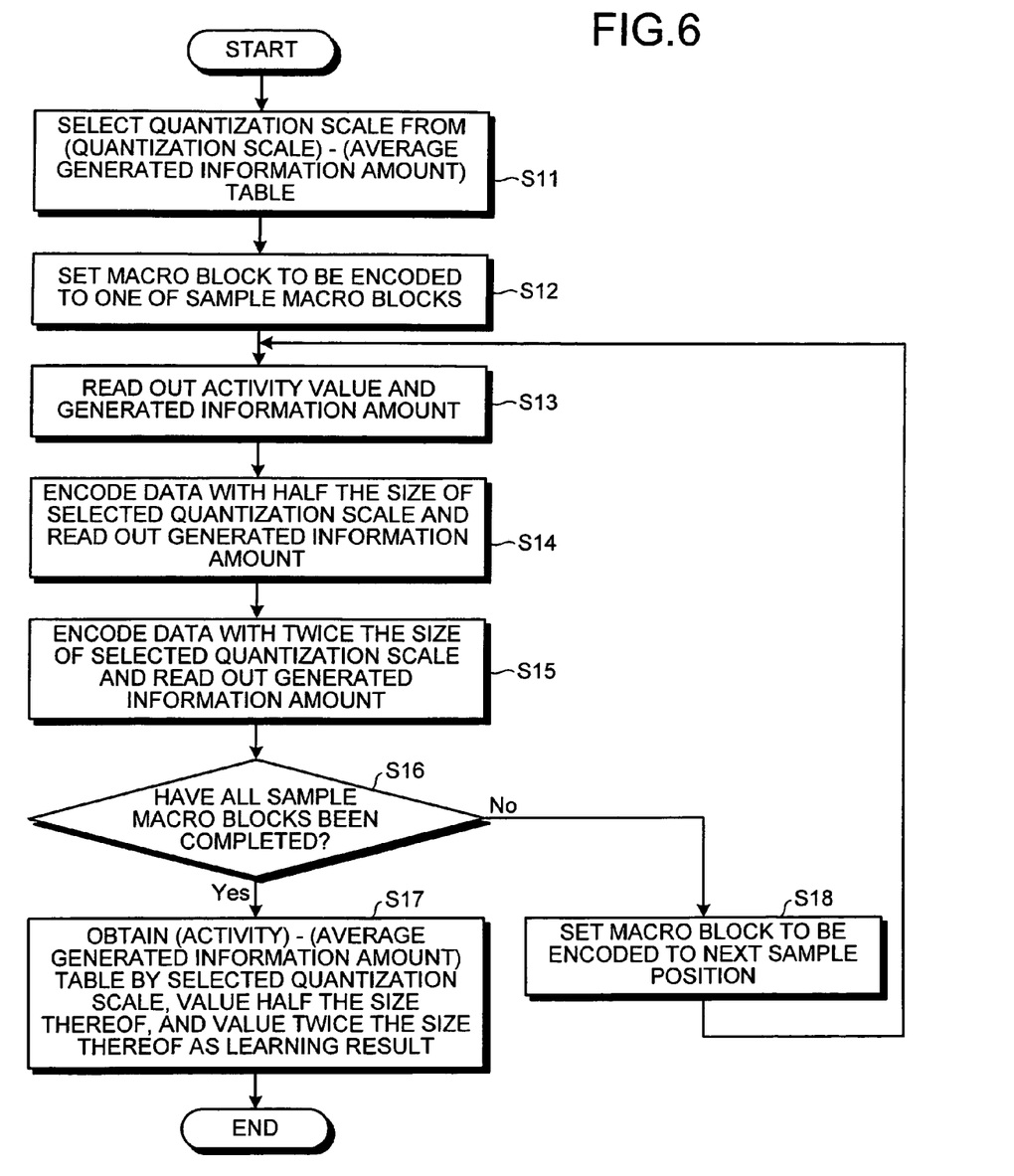
FIG. 6 is a flowchart of the learning process at a second stage.
Figure 7:
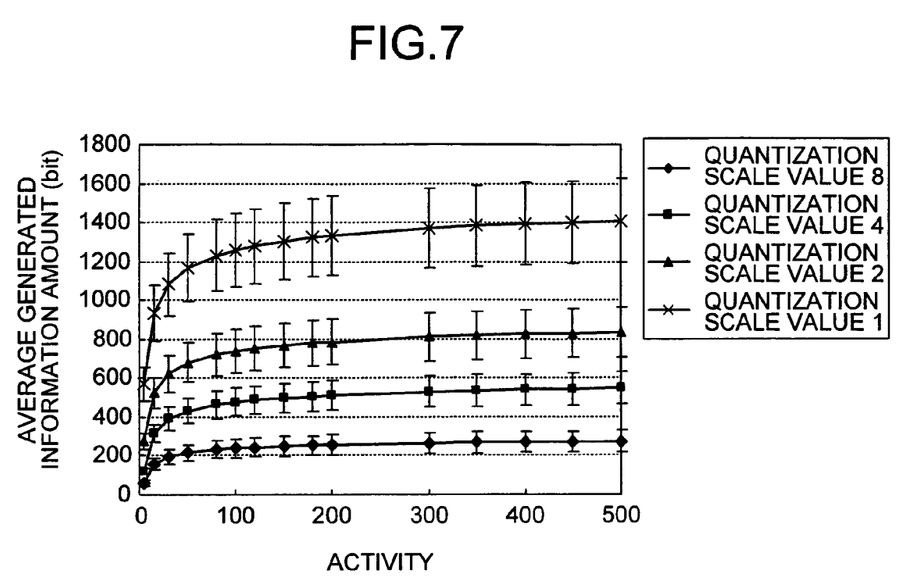
FIG. 7 is a graph of an activity versus average amount of generated information.

FIG. 5 is a graph of quantization scale versus average amount of generated information, indicating a relation between the quantization scale and the average amount of generated information. FIG. 6 is a flowchart of the learning process at a second stage. FIG. 7 is a graph of an activity versus average amount of generated information, indicating a relation between the activity and the average amount of generated information. The activity here stands for disorder in a pattern.

As shown in FIGS. 3 and 4, when learning at the first stage is started, the image input unit 24 simply thins out the image data D transmitted from the image processing circuit 13 (see FIG. 1). The image input unit 24 obtains information, such as information of brightness and hue of the entire screen, and information of whether the screen has a fine pattern or a smooth pattern. The image input unit 24 does not perform various filtering processing, which consumes power, format conversion for converting 4:2:2 to 4:2:0, or the like. The image data processed by the image input unit 24 is written in the original image storage area 26 in the memory 25 as original image data D1.

However, a function of obtaining cumulative difference at the same pixel position of the previous frame, of time filtering, becomes effective. When there is little change on the screen, execution of the subsequent processing is skipped. Accordingly, power consumption can be reduced. Further, the image input unit 24 fetches the input image data D, not for the entire screen, but by limiting to a part of the screen, for example, an upper, middle, lower, left, middle, or right partial region 51 on the screen. Accordingly, access processing with respect to the memory 25 can be eliminated.

When having completed the processing by the image input unit 24 (step S1: Yes), the overall controller 36 reads out the current image from the image input unit 24, that is, mean value information 11, such as average of the brightness and the hue of the original image and average of complexity of the design (step S2). The motion searching unit 29 performs pattern matching between data D2 of the original image stored in the original image storage area 26 and the reference image stored in the reference image storage area 27, that is, data D3 of the image in the previous flame, to obtain a motion vector. At this time, one or more macro blocks in the partial area 51 of the original image fetched by the image input unit 24 and a macro block of the reference image corresponding thereto are compared with each other for each macro block.

When having completed the processing by the motion searching unit 29 (step S3, Yes), the overall controller 36 reads out information 12 about the mean value of the motion vector and the mean value of the absolute value of the motion vector from the motion searching unit 29 (step S4). The size of the mean value of the absolute value of the motion vector corresponds to the degree of severity of the motion. The size of a value obtained by subtracting the mean value of the motion vector from the mean value of the absolute value of the motion vector corresponds to the degree of disorder of the motion.

The overall controller 36 then refers to the amount of information generated table group 10 stored in the nonvolatile memory 19, to select a combination having a value close to the value of brightness of the original image, hue and complexity of the pattern, severity of the motion, and disorder of the motion, from sorting data for each of various scenes. The overall controller 36 obtains the quantization scale-average amount of information generated table for the selected scene as learning result at the first stage (step S5). The quantization scale-average amount of information generated table, being the learning result at the first stage, is designated as a first table.

The quantization scale-average amount of information generated table will be explained. FIG. 5 expresses changes in the average amount of information generated in a graph when the value of the quantization scale is changed, for example, with respect to four scenes of from scene 1 to scene 4. As shown in FIG. 5, even if the value of the quantization scale is the same, the amount of information generated is different according to the scene. Therefore, for example, when the value of the quantization scale is set to 10 at the time of starting video recording and encoding is performed, in the state that the first scene at the time of starting video recording is unknown, if the target information amount is 1000, the amount of information generated in the scene 3 in FIG. 5 becomes substantially the same as the target information amount.

On the other hand, in the scene 1 and the scene 2, since the amount of information generated is too small with respect to the target information amount, it is necessary to increase the amount of information generated by decreasing the value of the quantization scale by the feedback control. On the other hand, in the scene 4, since the amount of information generated is too large with respect to the target information amount, it is necessary to increase the value of the quantization scale, to reduce the amount of information generated. Thus, since the relation between the value of the quantization scale and the amount of information generated is not uniform throughout the scenes, it is difficult to completely understand the optimum value of the quantization scale at the time of starting video recording.

According to the present embodiment, therefore, encoding is performed beforehand with various values of the quantization scale, with respect to a plurality of patterns obtained by changing the information of the brightness and the hue of the entire screen, the information of whether the screen has a fine pattern or a smooth pattern, or the information of severity and disorder of motion variously, and combining these pieces of information. The relation between the value of the quantization scale and the amount of information generated obtained as a result of encoding is stored as empirical information (amount of information generated table group 10) in the form of the relations between the scenes 1 to 4 as shown in FIG. 5.

Then, at the time of first stage learning by pre-encoding, it is roughly presumed which system the input image is close to, by comparing the input image with the empirical information (amount of information generated table group 10). At the point in time when the first stage learning has finished up to here, the value of the quantization scale at which the amount of information generated sufficiently approximates to the target information amount can be presumed. Therefore, the configuration may be such that when it is necessary to reduce the power consumption at the time of learning as much as possible, the entire learning may be finished when the first stage learning has finished. When only the first stage learning is necessary, only the image input unit 24 and the motion searching unit 29 in the encoding unit 1 need to be operated.

When there is a reserve in the power consumption at the time of learning, or when it is necessary to presume the value of the quantization scale more accurately, learning at the second stage explained below is performed subsequent to the first stage learning. As shown in FIGS. 3 and 6, when the second stage learning is started, at first, the overall controller 36 selects a quantization scale (value) having high possibility that the amount of information generated at the time of starting video recording becomes the target amount of information generated, based on the first table, being the first stage learning result (step S11). A macro block to be encoded is set to one of sample macro blocks (step S12).

The motion compensating unit 30 obtains image data D4 in the sample macro block of the original images stored in the original image storage area 26 and image data D5 in a corresponding macro block of the reference images stored in the reference image storage area 27, as well as obtaining motion vector information 13 from the motion searching unit 29. The motion compensating unit 30 then predicts the image data in the currently corresponding macro block from the image data D5 in the reference image macro block, based on the motion vector information 13, to obtain a difference between the data of the predicted image and the image data D4 in the sample macro block of the original image.

The orthogonal transform unit 31 performs orthogonal transformation with respect to difference data D6 obtained by the motion compensating unit 30. The quantization unit 32 performs quantization with respect to data D7 after the orthogonal transformation. By these types of processing, data in a high frequency domain, which is indistinctive visually, is reduced. The variable-length encoding unit 33 encodes data D8 after actual quantization by using the quantization scale value selected at step S11. However, the data amount in the final bit stream is only determined, and since the actual bit stream is not necessary, the variable-length encoding unit 33 does not output the bit stream.

The dequantization unit 34 and the deorthogonal transform unit 35 do not operate. Accordingly, generation of a reproduced image by the motion compensating unit 30 is not performed. Thus, by operating only a part of the functional blocks in the encoding unit 2 (see FIG. 2), the power consumption at the time of the second stage learning can be reduced. The overall controller 36 reads out an activity value I4 from the motion compensating unit 30 and a value I5 of the amount of information generated from the variable-length encoding unit 33 (step S13), and stores a value I6 thereof in the memory 21 for storing learning results as a part of the second stage learning result data 20.

Subsequently, the variable-length encoding unit 33 obtains a value half the size of the quantization scale value selected at step S11, to encode data D8 after quantization by using the obtained value. The overall controller 36 reads out the value I5 of the amount of information generated from the variable-length encoding unit 33 (step S14), and stores the value I6 in the memory 21 for storing learning results as a part of the second stage learning result data 20. Likewise, the overall controller 36 encodes data D8 after quantization by using a value twice the size of the quantization scale value selected at step S11, reads out the value I6 of the amount of information generated at that time (step S15), and stores the value in the memory 21 for storing learning results as a part of the second stage learning result data 20.

Since there is a trade-off relationship between the improvement of image quality by making learning more accurate and the power consumption, one or both of steps S14 and S15 may be omitted and empirical estimate value may be used. Further, when higher accuracy is required, magnification may be finely set other than twice and half the size, with respect to the quantization scale value selected at step S11.

Until processing at steps S13 to S15 has finished for all sample blocks (step S16: No), macro blocks to be encoded are sequentially set to the next sample position (step S18), to repeat the processing at steps S13 to S15. When the processing for all sample macro blocks has finished (step S16: Yes), the variable-length encoding unit 33 obtains the activity-average amount of information generated table for the respective values of the quantization scale value selected at step S11, the value half the size thereof, and the value twice the size thereof as the second stage learning result (step S17), to finish the second stage learning. The activity-average amount of information generated table corresponds to a second table.

FIG. 7 is a graph of an activity versus average amount of generated information, for sample macro blocks at some positions on the screen, with respect to a certain scene. By obtaining such learning results, when actual encoding of the respective macro blocks is to be performed, the amount of information generated can be predicted at a stage before the actual encoding from the activity of the macro block.

When there is a large difference between the amount of information generated and the target information amount with the quantization scale value selected based on the first stage learning result, fine adjustment is performed for the quantization scale value in a unit of macro block, thereby speeding up the convergence to the target information amount. When the quantization scale value is finely adjusted in order to improve the image quality of a particular observable portion on the screen, such as a focused portion, since it can be predicted how much the amount of information generated increases, the amount of information generated at the time of starting video recording can be controlled highly accurately.

The power reduction effect by performing learning by pre-encoding will be explained next. The power reduction effect depends on how much the image fetching range by the image input unit 24 is narrowed down with respect to the entire screen, and to which degree the macro block, of the fetched image, to be subjected to the motion search processing and encoding is limited.

As an example, when the motion search range is roughly limited to a range of vertical±16 pixels and horizontal±32 pixels, with respect to the upper, middle, lower, left, middle, and right nine macro blocks on the screen, the target image at the time of pre-encoding has approximately 18,432 pixels (=(32×2×3)×(16×2×3) pixels). This is about 5% of 345,600 pixels (=720×480 pixels) in the case of MP@ML corresponding to a normal television screen. Accordingly, the power consumption has the similar rate.

However, when learning is performed with respect to a part of macro blocks, the learning accuracy may be deteriorated as compared to an instance that learning is performed with respect to all macro blocks on the entire screen. Therefore, the image fetching area by the image input unit 24 and the number of macro blocks to be subjected to motion search and encoding processing can be set, based on the balance between the required learning accuracy and the power reduction.

Figure 8:
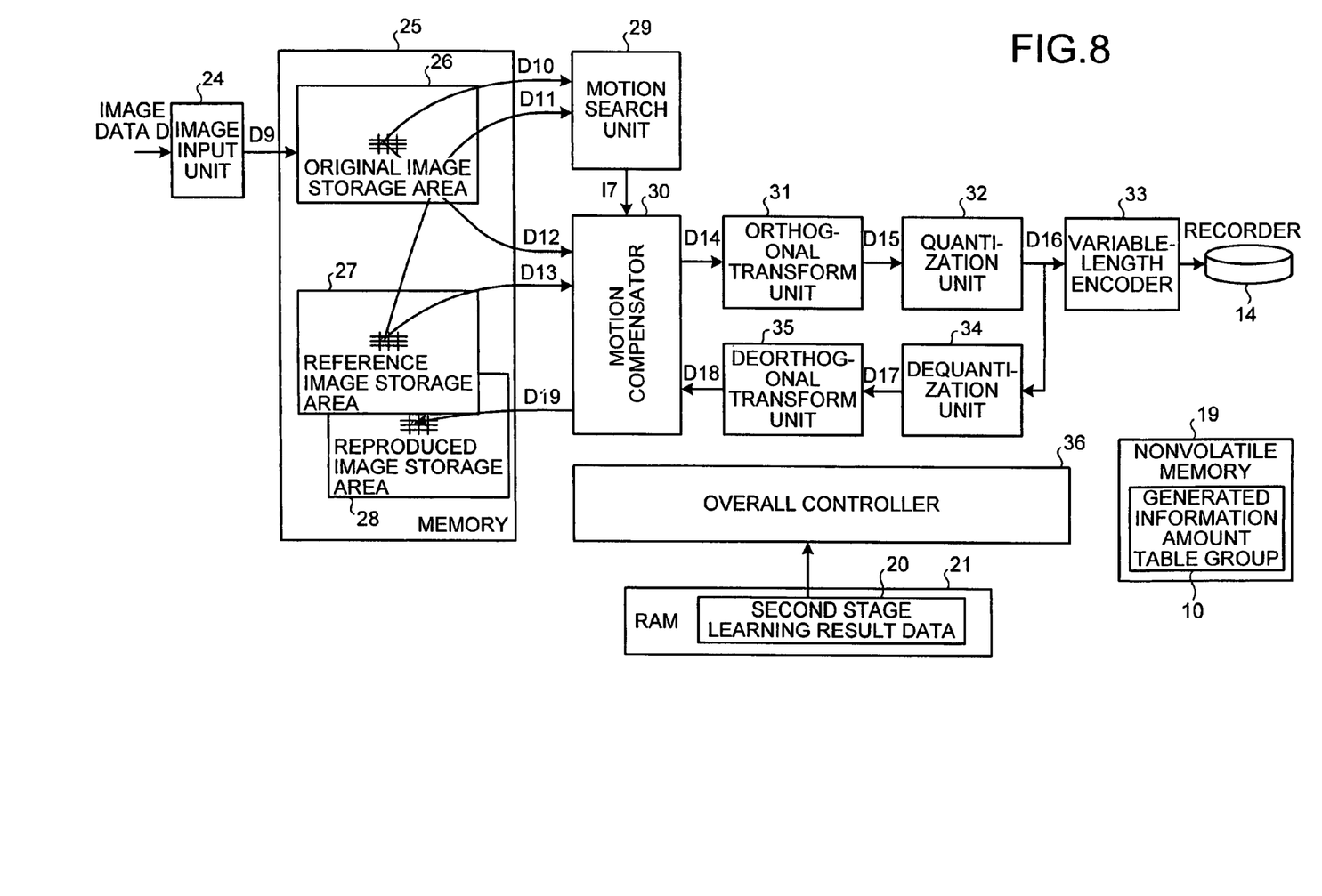
FIG. 8 is a block diagram for explaining an encoding process after starting video recording.

The normal encoding processing after starting the video recording will be explained below. FIG. 8 is a block diagram for explaining an encoding process after starting video recording. At the time of starting video recording, an appropriate quantization scale is selected based on the learning result by pre-encoding, to start encoding. After having started video recording, the image input unit 24 performs various kinds of spatial filtering, time filtering, format conversion for changing 4:2:2 to 4:2:0, and the like, with respect to the image data D transmitted from the image processing circuit 13 (see FIG. 1). The image data processed by the image input unit 24 is written in the original image storage area 26 in the memory 25, as original image data D9.

The motion searching unit 29 then performs pattern matching between data D10 of the original image stored in the original image storage area 26 and data D11 of the reference image stored in the reference image storage area 27 for each macro block, to obtain a motion vector. The motion compensating unit 30 obtains macro block data D12 of the original image stored in the original image storage area 26 and corresponding macro block data D13 of the reference image stored in the reference image storage area 27, as well as obtaining motion vector information 17 from the motion searching unit 29.

The motion compensating unit 30 then generates macro block data of a predicted image from the macro block image data D5 of the reference image, based on the motion vector information I7, to obtain a difference between the macro block data of the predicted image and the macro block data D12 of the original image. The processing for obtaining the difference is performed for each macro block. Subsequently, the orthogonal transform unit 31 performs orthogonal transformation with respect to difference data D14 obtained by the motion compensating unit 30. The quantization unit 32 performs quantization with respect to data D15 after the orthogonal transformation. By these types of processing, data in a high frequency domain, which is indistinctive visually, is reduced.

Data D16 from which the high frequency domain has been reduced is encoded by the variable-length encoding unit 33, and allocated to the bit stream. At this stage, the final data amount is decided. The dequantization unit 34 performs dequantization processing of the data D16 before being encoded, and the deorthogonal transform unit 35 performs deorthogonal transformation of the dequantized data D17. The motion compensating unit 30 uses the deorthogonally-transformed data D18 to generate reproduced image data. The generated reproduced image data D19 is stored in the reproduced image storage area 28 in the memory 25. The stored reproduced image data D19 is used as a reference image in the encoding processing of the next frame.

As explained above, according to the embodiment, learning is performed based on restrictive information such as the brightness and the hue of the entire screen, whether the screen has a fine pattern or a smooth pattern, severity and disorder of the motion, and correlation between the quantization scale value and the amount of information generated at the time of encoding. Therefore, learning can be performed with power consumption much less than the power consumption when learning is executed by performing encoding on the entire screen, like the actual encoding processing. Further, when encoding is performed by a quasi-two path system in which there are many frame memories before encoding, many image data is stored therein beforehand, and actual encoding is started after completion of learning, the method causes a large increase in the circuit. On the other hand, according to the embodiment, learning can be performed without causing an increase in the circuit. Therefore, actual encoding can be started stably.

The present invention is not limited to the embodiment, and can be variously changed. For example, the encoding parameters other than the quantization scale, or the combination of the quantization scale and other encoding parameters may be adjusted by learning by pre-encoding. While according to the present embodiment, a movie camera has been explained as an example, the present invention is also applicable to a digital camera having a video recording function of motion pictures, or a mobile phone with camera having the video recording function of motion pictures. Furthermore, the invention is not limited to an instance that a motion picture is encoded based on the MPEG-2 Standard, and is also applicable to an instance that a motion picture is encoded based on other standards.

Furthermore, according to the present invention, an encoding unit that can perform learning with low power consumption before starting video recording and can perform encoding appropriately at the time of starting video recording, a video recording apparatus using the same, an encoding method, and a video recording method can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An encoding apparatus comprising:
a pre-encoding unit that performs learning based on input image data from before starting a video recording; and
an encoding unit that encodes image data to be recorded, using an encoding parameter determined based on a result of the learning,
wherein the pre-encoding unit includes:
an image input unit that obtains brightness, hue, and complexity of a pattern of a current image based on the input image data;
a motion searching unit that obtains a motion vector of an image based on current image data and past image data; and
a table group that represents a relation between encoding parameters and an amount of information generated with respect to various scenes, and
the pre-encoding unit selects a first table that is close to a combination of the brightness, the hue, and the complexity of a pattern of the current image and the motion vector, from the table group, and takes the first table as the result of the learning.

2. The encoding apparatus according to claim 1, wherein the pre-encoding unit includes:
a motion compensating unit that predicts the current image data from the past image data based on the motion vector, and obtains a difference between predicted current-image-data and actual current-image-data; and
an information-amount obtaining unit that obtains the amount of information generated by encoding the difference, and
the pre-encoding unit reads a value of disorder of the pattern from the motion compensating unit, selects at least one encoding parameter value based on the first table, encodes the difference, using the encoding parameter value selected, to obtain the amount of information generated, obtains a second table expressing a relation between the disorder in the pattern and the amount of information generated based on the amount of information generated, and takes the second table as a new result of the learning.

3. The encoding apparatus according to claim 1, wherein the image input unit thins out the input image data, and
the pre-encoding unit uses the image data thinned out by the image input unit to perform the learning before starting the video recording.

4. The encoding apparatus according to claim 1, wherein when there is little change in a same pixel position between the current image data and the past image data, the learning before starting the video recording is suspended continuously.

5. The encoding apparatus according to claim 1, wherein the pre-encoding unit performs the learning based on image data in a partial region of one screen before starting the video recording.

6. A video recording apparatus comprising:
a pre-encoding unit that performs learning based on input image data from before starting a video recording; and
an encoding unit that encodes image data to be recorded using an encoding parameter determined based on a result of the learning; and
a recording unit that records the image data at a time of starting the video recording,
wherein the pre-encoding unit includes
an image input unit that obtains brightness, hue, and complexity of a pattern of a current image based on the input image data;
a motion searching unit that obtains a motion vector of an image based on current image data and past image data; and
a table group that represents a relation between encoding parameters and an amount of information generated with respect to various scenes, and
the pre-encoding unit selects a first table that is close to a combination of the brightness, the hue, and the complexity of a pattern of the current image and the motion vector, from the table group, and takes the first table as the result of the learning.

7. The video recoding apparatus according to claim 6, wherein
the pre-encoding unit includes
a motion compensating unit that predicts the current image data from the past image data based on the motion vector, and obtains a difference between predicted current-image-data and actual current-image-data; and
an information-amount obtaining unit that obtains the amount of information generated by encoding the difference, and
the pre-encoding unit reads a value of disorder of the pattern from the motion compensating unit, selects at least one encoding parameter value based on the first table, encodes the difference, using the encoding parameter value selected, to obtain the amount of information generated, obtains a second table expressing a relation between the disorder in the pattern and the amount of information generated based on the amount of information generated, and takes the second table as a new result of the learning.

8. The video recording apparatus according to claim 6, wherein
the image input unit thins out the input image data, and
the pre-encoding unit uses the image data thinned out by the image input unit to perform the learning before starting the video recording.

9. The video recording apparatus according to claim 6,
wherein when there is little change in a same pixel position between the current image data and the past image data, the learning before starting the video recording is suspended continuously.

10. The video recording apparatus according to claim 6,
wherein the pre-encoding unit performs the learning based on image data in a partial region of one screen before starting the video recording.

11. An encoding method comprising:
a pre-encoding, from before starting a video recording, including
obtaining brightness, hue, and complexity of a pattern of a current image based on input image data;
obtaining a motion vector of an image based on current image data and past image data;
selecting a first table that is close to a combination of the brightness, the hue, and the complexity of a pattern of the current image and the motion vector, from a table group that represents a relation between encoding parameters and an amount of information generated with respect to various scenes, the table group being prepared in advance; and taking the first table as a result of learning; and encoding image data to be recorded, using an encoding parameter determined based on the result of the learning.

12. The encoding method according to claim 11, wherein the pre-encoding further includes predicting the current image data from the past image data based on the motion vector;

obtaining a difference between predicted current-image-data and actual current-image-data;

reading a value of disorder of the pattern;

selecting at least one encoding parameter value based on the first table;

encoding the difference, using the encoding parameter value selected, to obtain the amount of information generated;

obtaining a second table expressing a relation between the disorder in the pattern and the amount of information generated based on the amount of information generated; and taking the second table as a new result of the learning.

13. The encoding method according to claim 11, wherein the pre-encoding further includes thinning out the input image data; and performing the learning before starting the video recording, using the image data thinned out.

14. The encoding method according to claim 11, wherein when there is little change in a same pixel position between the current image data and the past image data, the learning before starting the video recording is suspended continuously.

15. The encoding method according to claim 11, wherein the pre-encoding unit further includes performing the learning based on image data in a partial region of one screen before starting the video recording.

16. A video recording method comprising:

a pre-encoding, from before starting a video recording, including obtaining brightness, hue, and complexity of a pattern of a current image based on input image data;

obtaining a motion vector of an image based on current image data and past image data;

selecting a first table that is close to a combination of the brightness, the hue, and the complexity of a pattern of the current image and the motion vector, from a table group that represents a relation between encoding parameters and an amount of information generated with respect to various scenes, the table group being prepared in advance; and taking the first table as a result of learning;

encoding image data to be recorded, using an encoding parameter determined based on the result of the learning; and recording the image data at a time of starting the video recording.

17. The video recording method according to claim 16, wherein the pre-encoding further includes predicting the current image data from the past image data based on the motion vector;

obtaining a difference between predicted current-image-data and actual current-image-data;

reading a value of disorder of the pattern;

selecting at least one encoding parameter value based on the first table;

encoding the difference, using the encoding parameter value selected, to obtain the amount of information generated;

obtaining a second table expressing a relation between the disorder in the pattern and the amount of information generated based on the amount of information generated; and taking the second table as a new result of the learning.

18. The video recording method according to claim 16, wherein the pre-encoding further includes thinning out the input image data; and performing the learning before starting the video recording, using the image data thinned out.

19. The video recording method according to claim 16, wherein when there is little change in a same pixel position between the current image data and the past image data, the learning before starting the video recording is suspended continuously.

20. The video recording method according to claim 16, wherein the pre-encoding unit further includes performing the learning based on image data in a partial region of one screen before starting the video recording.

* * * * *